Oct. 22, 1963   G. W. G. McDONALD   3,108,048
APPARATUS FOR CONTACTING OF DIFFERENT DENSITY FLUIDS
Filed Sept. 12, 1960
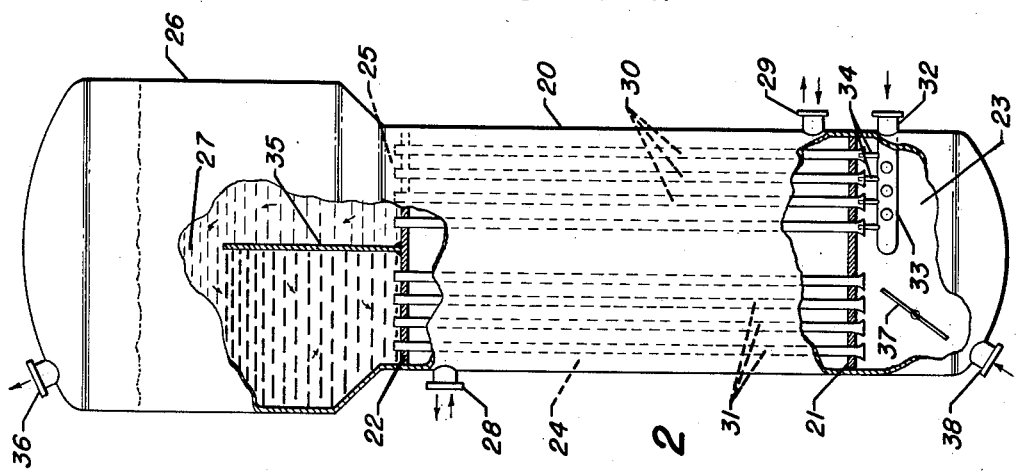
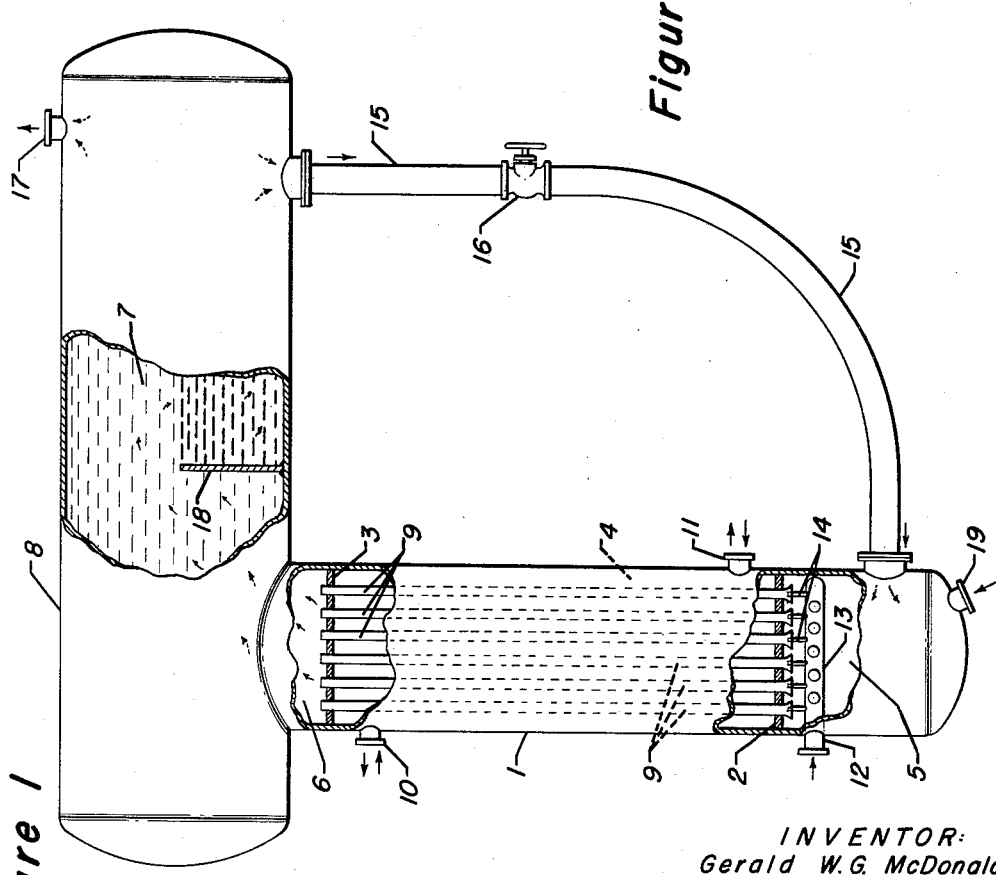
INVENTOR:
Gerald W. G. McDonald
BY: Chester J. Giuliani
Philip T. Liggett
ATTORNEYS

United States Patent Office 3,108,048
Patented Oct. 22, 1963

3,108,048
APPARATUS FOR CONTACTING OF DIFFERENT
DENSITY FLUIDS
Gerald W. G. McDonald, Mount Prospect, Ill., assignor to Universal Oil Products Company, Des Plaines, Ill., a corporation of Delaware
Filed Sept. 12, 1960, Ser. No. 55,600
1 Claim. (Cl. 196—46)

This invention relates to an improved means for effecting the contacting of fluids of different densities and more particularly, to a method for converting or treating a fluid mixture in a plurality of separate flow paths under controlled temperature conditions.

Various methods for effecting flow mixing and various types of mixing reactors have been utilized in processing plants, however, it is a principal object and feature of the present improved arrangement to provide for the efficient mixing of fluid streams and the internal recirculation of at least one fluid medium within a reaction zone without the use of mechanical agitating means.

It is also an object of the invention to provide a compact unitary conversion system which utilizes jet stream introduction of one fluid medium to enhance recirculation of a different density fluid medium internally within the confined system.

A still further object of the invention is to provide an apparatus which may accommodate heterogeneous types of fluid mediums, as for example, a gaseous or vaporous stream may comprise the low density fluid medium and subdivided solid particles may comprise the more dense fluid medium.

The present method of operation and the improved arrangement of the apparatus is particularly adapted for use in effecting rapid and uniform mixing of reactant streams in the presence of a substantially immiscible liquid having a different density or specific gravity than either of the reactant streams, as is carried out in the catalytic alkylation of hydrocarbons. In the alkylation process, isoparaffins are reacted with olefins in the presence of a mineral acid catalyst, such as hydrofluoric acid, sulfuric acid or phosphoric acid. The reactants and catalyst are introduced into a reaction zone in a liquid state and are maintained at a temperature suitable for conducting the desired reaction. Temperature control is particularly desirable in effecting the alkylation reaction in order to minimize the polymerization of the olefinic portion of the reactant stream. The polymerization effect is lessened by carrying out the reaction at a reduced temperature, so that it is particularly desirable to provide cooling in connection with the reaction zone in order to maintain optimum conversion. Efficient cooling is provided in connection with the present invention by maintaining a heat exchange arrangement contiguous with a multiple flow path reaction zone. In connection with the alkylation process, the present contacting scheme and apparatus arrangement is also desirable in providing means which permits at least a partial separation of hydrocarbons and the acid phase prior to discharging a product stream, whereby a substantial quantity of the heavier acid catalyst is maintained within the contacting zone for recirculation and reuse in contacting the continuously introduced hydrocarbon reactant streams.

In addition to the alkylation of olefins and isoparaffins, the present system and apparatus may well be utilized for other conversions as, for example, the alkylation of an olefin with an aromatic, i.e., ethylene with benzene, to produce ethylbenzene in the presence of an acid catalyst. Also, hydrocarbon vapors may contact subdivided solid catalyst particles in a catalytic cracking or reforming operation, with the vaporous stream being introduced in the same manner as a less dense liquid stream and the subdivided catalytic particles being introduced and handled as if introduced in the manner equivalent to a more dense liquid stream.

In a broad aspect, the present invention provides a method for contacting at least two fluid mediums which have different densities under controlled temperature conditions which comprises, introducing one fluid medium in a plurality of jet streams into one end of a vertically disposed multiple passage reaction zone and contacting a different density fluid maintained therein, with the jet streams of the first fluid medium being introduced at a rate sufficient to effect the eduction and entrainment of the different density fluid maintained therein, reacting the resulting fluid mixture in a plurality of separate elongated flow paths maintained in indirect heat exchange relationship with a heat exchange medium surrounding the multiple passageways of the reaction zone, discharging a resulting fluid product and unreacted fluids from the reaction zone into a confined separation zone communicating with the outlet end of the reaction zone, recirculating from the separation zone at least a portion of the fluid which is entrained with the jet streams of fluid medium being introduced to the reaction zone, and withdrawing a fluid product stream from the separation zone.

The flow system may vary, in one instance a less dense fluid medium may be introduced into the lower end of the vertical reaction zone in a plurality of jet streams to effect the eduction of the heavier fluid medium therewith upwardly through the plurality of passageways to in turn effect the desired conversion in a plurality of separate flow paths in heat exchange relationship with a surrounding temperature controlling fluid medium. One the other hand, a heavier or more dense fluid medium may be introduced in a plurality of jet streams into the upper portion of a vertical reaction zone to entrain a less dense fluid medium and passed downwardly through a plurality of separate passageways, in which case a separation zone is maintained in communication with the lower outlet end of the reaction zone.

In another embodiment, the present invention provides an apparatus for contacting fluid mediums of different densities which comprises in combination, a vertically elongated confined reaction section having a partition plate across each end portion thereof and forming a fluid inlet section and a fluid outlet section, the latter end section connecting to and being in open communication with an enlarged confined separation section, a plurality of spaced open-ended tubular members extending through the partition plates of said reaction section to the respective end sections thereof and providing a plurality of separate spaced contact passageways through the central portion of the reaction section and a separated heat exchange section surrounding the tubular members, fluid inlet and outlet means connecting to the heat exchange section, a fluid inlet to the inlet end section of said reaction section, a separate fluid passageway from said separation section to the fluid inlet section for recirculation of a fluid phase thereto and a fluid outlet from said separation section.

In a modification of the apparatus, a fluid inlet means to the reaction zone may be at the upper end of a vertically disposed section whereby the different density fluid streams mix and pass downwardly through the separate confined passageways to a lower disposed separation section, or alternatively, the fluid inlet means may be at the lower end of the reaction zone whereby to provide an upwardly moving and mixing flow to a superimposed separation section. Also, in a special embodiment of the apparatus, a grouped portion of the tubular members may be utilized to provide a plurality of elongated reaction passageways for the mixed fluid streams as they flow to the separation section while a remaining grouped portion of tubular members, or an internal conduit, may be utilized for return fluid flow from the separation section back to the inlet end section of the reaction zone. Suitable valving means may also be utilized to effect the controlled flow of the fluid medium being recirculated within the confined unitary system. Such valve control means may be incorporated into the conduit or passageway which effects the recirculation of fluid medium from the separation section back to the inlet end section of the reaction zone, or such valve control means may be placed within the fluid inlet section adjacent the outlet of the recirculating fluid passageway.

Reference to the accompanying drawings and the following description thereof will serve to more clearly illustrate the construction and arrangement of the apparatus, as well as means for effecting improved contacting of different density fluids under controlled temperature conditions.

FIGURE 1 of the drawing is an elevational view, partially in section, indicating one embodiment of the unitary system.

FIGURE 2 of the drawing is another elevational view, partially in section, illustrating a modified embodiment of the unitary apparatus where both upward and downward flow from the inlet end of the reaction zone to the separation zone is effected through tubular members in heat exchange relationship with a heat exchange medium.

Referring now to FIGURE 1 of the drawing, there is shown a vertically disposed housing 1 having a lower partition plate 2 and an upper partition plate 3 which provides a centrally positioned confined heat exchange section 4 and a lower fluid inlet end section 5. An upper fluid outlet section 6 communicates with a superimposed separation section 7 maintained in a confined shell or housing 8.

A plurality of open-ended tubular members 9 extend vertically between the partition plates 2 and 3 to provide a multiplicity of elongated flow paths between the inlet end section 5 and the outlet section 6. The tubular members 9 thus extend through the heat exchange zone 4 such that they may be surrounded by a heat exchange fluid medium introduced into and discharged from zone 4 by means of respectively the nozzles 10 and 11. At the inlet end section 5 is a fluid inlet nozzle 12 which connects with an internal conduit or distributing header 13 which in turn has a plurality of nozzles 14 projecting upwardly therefrom at positions which are in alignment with the lower open ends of the spaced tubular members 9. This arrangement permits a fluid medium being introduced through inlet 12 to be distributed in a plurality of jet streams that are directed upwardly into the lower ends of the open-ended tubular members 9 and effect an eduction and entrainment of a fluid medium which is maintained within the lower inlet end section 5 surrounding the distributing header 13 of the nozzles 14. A resulting fluid mixture may thus effect flow contacting and conversion as it is passed upwardly through the elongated confined passageways of the tubular members 9 and in heat exchange relationship with the fluid medium maintained within the heat exchange section 4. The resulting conversion products and unreacted fluids are discharged from the open upper ends of the tubular members 9 and into the superimposed housing 8 maintaining an enlarged separation zone 7. The heavier or more dense fluid medium, which settles to the lower portion of the separation zone 7, is recirculated through a depending conduit 15 having valve 16. The conduit 15 opens into and connects with the lower fluid inlet section 5, whereby recirculation of the heavier fluid medium is maintained within the unitary system. A lower density fluid product is withdrawn from the upper portion of separation chamber 8 by way of outlet nozzle 17. A partial baffle or wier member 18 is provided across the bottom portion of separation chamber 8 to preclude flow of the heavier denser fluid medium from the separation zone 7 back to the top outlet end section 6 of the reaction zone.

In the utilization of the present unitary apparatus in effecting the conversion operation as, for example, in the aforementioned alkylation of an isoparaffin with an olefinic hydrocarbon in the presence of a liquid acid catalyst, the operation may be carried out in the following manner. A mixed reactant stream of olefinic and isoparaffinic hydrocarbons is introduced through inlet 12 and distributed through the header 13 into a plurality of upwardly projecting outlet nozzles 14, which as previously described, are positioned in alignment with the open ends of the plurality of conduits or tubular members 9. An acid catalyst phase, such as hydrofluoric acid, is maintained within the lower portion of the unit by recirculation, however, additional acid may be introduced into the lower inlet end section 5 by means of an inlet nozzle 19. The acid catalyst phase is educted and entrained with the hydrocarbon phase so that there is an intimate mixing of the fluid mediums as they pass upwardly through the tubular members 9 to discharge into the end section 6 of the reaction zone. A cooling fluid medium, such as water, may be continuously passed through the heat exchange zone 4 by means of inlet and outlet nozzles 10 and 11 to maintain a desired low temperature conversion zone for the alkylation reaction. The resulting alkylated hydrocarbons being discharged into the separation zone 7 along with unreacted products and acid catalyst effect at least a partial separation within the enlarged chamber 8 such that a heavier, more dense acid catalyst phase settles to the lower portion of the separation zone 7 and flows in a gravity stream through the conduit 15 to the lower inlet end section 5 whereby recirculation is maintained to provide contact with a continuously introduced reactant stream entering through the inlet 12. The product stream and entrained unreacted reactant fluids and acid being discharged through outlet nozzle 17 may be separated in suitable equipment, not shown and unreacted hydrocarbons and separated acid catalyst may be returned to the system for further contact in the present apparatus.

In a modified construction, the lower ends of the tubular members 9 may be designed and constructed to have flared or enlarged openings so as to provide an improved inlet flow and eduction of the heavier fluid phase surrounding the nozzles 14 which in turn are emitting the high velocity jet streams of reactant fluid from the inlet 12. Various types of valving or control means may be utilized to regulate recirculation of the dense fluid medium between the separation zone and the reaction zone, however, a conventional valve 16 is indicated in the present embodiment as positioned within the conduit 15.

Referring now to FIGURE 2 of the drawing, there is shown a modified construction and arrangement of the chambers, with a vertically disposed housing 20 having a lower partition plate 21 and an upper partition plate 22 forming a lower inlet end section 23, an intermediate heat exchange section 24 and an upper fluid outlet end section 25. The latter section supports and is in open communication with an enlarged superimposed housing or chamber 26 maintaining a separation zone 27. As in connection with FIGURE 1, the heat exchange section 24 is provided with inlet and outlet nozzles 28 and 29 such that a suitable heat exchange fluid may be passed continuously through the heat exchange section to contact and surround a plurality of open-ended tubular members 30 and 31. The tubular members 30 and 31 extend through the respective partition plates 21 and 22 such that a plurality of fluid passageway means are provided between the inlet and outlet end sections of the reaction zone. A fluid inlet nozzle 32 connects with the lower inlet end section 23 and has a suitable distributing header 33 extending therefrom to in turn provide a plurality of upwardly projecting outlet nozzles 34 that are positioned in vertical alignment with the open ends of a grouped portion of tubular members 30. This arrangement permits upward flow of a plurality of jet streams of fluid being introduced through nozzle 32 and entrainment of a surrounding fluid medium maintained in the lower portion 23 such that there is a resulting flow mixing effected in the plurality of elongated passageways provided by the tubular members 30 and a discharge of resulting conversion products and unreacted materials within the separation zone 27. A vertical partition member 35, extending upwardly from the horizontal partition member 22, aids in making a divided zone within the separation chamber 26 such that a gravity separation of a more dense fluid may be aided and intermixing precluded from the discharge tubular members 30. Low density conversion products and unreacted materials may be discharged from the chamber 26 by way of outlet nozzle 36 while the heavier more dense fluid medium effecting a gravity separation and settlement to the lower portion of the chamber 26 will descend by gravity through the upper open ends of tubular members 31 and flow downwardly to the fluid inlet section 23. A pivotally arranged damper or valve plate 37 is placed within the fluid inlet end section 23 adjacent the lower end portions of the open end of tubular members 31 such that the recirculation flow of the denser fluid medium may to some degree be regulated and controlled in any one conversion operation.

The present embodiment operates in a manner similar to that set forth in connection with FIGURE 1 of the drawing, such that where, for example, less dense hydrocarbon reactants are contacting a heavier liquid acid catlayst phase, the hydrocarbon reactants will be introduced through the inlet 32 and through the plurality of upwardly projecting nozzles 34 so as to provide a plurality of high velocity jet streams that will entrain the acid phase therewith in an upward flow through elongated flow passageways provided by the tubular members 30. However, in the embodiment of FIGURE 2, the separated heavier acid catalyst phase settling to the lower portion of separation zone 27 is provided a descending flow path through a plurality of open-ended tubular members 31 which are maintained within the zone of the heat exchange section 24 having a suitable fluid cooling medium passing therethrough.

Where the apparatus is used for the alkylation of hydrocarbons, an inlet nozzle 38 may be provided, at the lower inlet end section 23, to provide for the addition of make-up acid catalyst or for the return of separated catalyst obtained from product separation equipment not illustrated.

As previously pointed out, the present improved method of contact and the improved unitary apparatus system may well be utilized for various fluid contacting operations. In the alkylation of hydrocarbons in the presence of heavier acid catalyst phases, the arrangement of the various portions of the apparatus and fluid inlets may be substantially as shown and described in the present drawing, however, in other types of conversions, it may be desirable to effect the introduction of the jet stream of fluid material at the upper end of the reaction section such that there is a downward flow through the plurality of tubular members in vertically descending flow mixing paths. In such arrangements, of course, the separation zones are maintained in open communication with the lower open-ended portions of the tubular members. In a vapor solids contact, the arrangement may be either way, with a vaporous reactant stream being introduced in a lower inlet end section to entrain finely divided particles of catalyst which descend to the lower inlet end section and the mixture contacted in a plurality of upwardly moving flow paths to superimposed separation sections whereby depending catalyst standpipes, such as by the single conduit 15 in FIGURE 1 of the drawing, or such as by the group of tubular members 31 in FIGURE 2 of the drawing, serve to recirculate catalyst particles to the lower end section. On the other hand, fluid reactant streams may be introduced to an upper inlet end section of a reaction zone and subdivided solid particles entrained therein for contact while in a plurality of descending flow paths to a lower separation section. In this arrangement, suitable air or gas lift means may be utilized to effect the elevation of catalyst particles from a lower separation section to an elevated inlet end section, such that the continuous recirculation of solid particles is maintained within the unitary system.

It is, of course, realized that the present embodiments are diagrammatic and that other minor modifications may be made with respect to shape and arrangement without departing from the scope of the present flow system and unitary apparatus arrangement.

I claim as my invention:

A fluid contacting apparatus comprising a vertically elongated housing, a first horizontal partition plate extending across the lower end portion of the housing above the bottom of the latter, a second horizontal partition plate extending across the upper end portion of the housing below the top of the latter, said partition plates dividing the interior of the housing into a lower fluid inlet section, an upper fluid outlet section and an intermediate heat exchange section, an enlarged separating chamber connected to and in open communication with said upper section, a plurality of horizontally spaced, open-ended tubular members extending vertically through said partition plates and through the entire length of said intermediate section and having their upper and lower open ends within said upper and lower sections, respectively, fluid inlet and outlet means connected to said intermediate section, a distributing header disposed in said lower section below the lower open ends of said tubular members, a fluid inlet connected to said header, a discharge nozzle extending upwardly from said header into the lower end of each of said tubular members, conduit means connecting said separating chamber to said lower inlet section, and a fluid outlet from said separating chamber.

References Cited in the file of this patent
UNITED STATES PATENTS

| | | |
|---|---|---|
| 2,386,681 | Hadden | Oct. 9, 1945 |
| 2,618,534 | Mrstik | Nov. 18, 1952 |
| 2,914,592 | Crow et al. | Nov. 24, 1959 |